(12) United States Patent
Miyata et al.

(10) Patent No.: US 7,892,686 B2
(45) Date of Patent: Feb. 22, 2011

(54) FUEL CELL SYSTEM WITH INTEGRAL GAS AND REFRIGERANT DRIVE DEVICE

(75) Inventors: Koichiro Miyata, Saitama (JP); Chihiro Wake, Saitama (JP); Jumpei Ogawa, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 1008 days.

(21) Appl. No.: 11/516,855

(22) Filed: Sep. 7, 2006

(65) Prior Publication Data
US 2007/0059570 A1 Mar. 15, 2007

(30) Foreign Application Priority Data
Sep. 7, 2005 (JP) ............... 2005-259975

(51) Int. Cl.
*H01M 8/04* (2006.01)
(52) U.S. Cl. .............. 429/437; 429/429; 429/433; 429/434; 429/436
(58) Field of Classification Search ............ 429/22, 429/24, 429, 433, 434, 436, 437
See application file for complete search history.

(56) References Cited
U.S. PATENT DOCUMENTS
4,738,903 A * 4/1988 Garow et al. ............ 429/437

6,365,289 B1 * 4/2002 Lee et al. ............... 429/13

FOREIGN PATENT DOCUMENTS
JP 2004-234902 8/2004

* cited by examiner

*Primary Examiner*—Patrick Ryan
*Assistant Examiner*—Julian Mercado
(74) *Attorney, Agent, or Firm*—Nelson Mullins Riley & Scarborough LLP; Anthony A. Laurentano

(57) ABSTRACT

This fuel cell system is equipped with a fuel cell having a reaction gas flow passage, generating power by the reaction gas being supplied to the reaction gas flow passage, having a refrigerant flow passage, and cooled by the refrigerant being supplied to the refrigerant flow passage; a reaction gas supply device for supplying the reaction gas to the reaction gas flow passage; a refrigerant supply device for supplying the refrigerant to the refrigerant flow passage; a refrigerant supply restriction device for restricting a refrigerant supply amount to the refrigerant flow passage; and a controller for controlling the refrigerant supply restriction device, wherein the reaction gas refrigerant supply devices have a drive device in common and are integrally driven, and wherein when warming up the fuel cell, the controller controls the refrigerant supply restriction device and reduces the refrigerant supply amount to the refrigerant flow passage.

12 Claims, 8 Drawing Sheets

FUEL CELL SYSTEM WITH INTEGRAL GAS AND REFRIGERANT DRIVE DEVICE

BACKGROUND OF THE INVENTION

1. Field of the Invention

The present invention relates to a fuel cell system.

2. Description of the Related Art

Recently, flourishing is a development of a polymer electrolyte fuel cell (PEFC: hereinafter referred to as "fuel cell") where hydrogen is supplied to an anode and oxygen to a cathode, thereby an electrochemical reaction occurs and power is generated. The fuel cell is being applied in a wide range to such a fuel cell vehicle run by power generated the cell and a home power source, and also hereafter, its application range is expected to expand.

If generating power, such the fuel cell generates heat by itself according to an electrochemical reaction. Consequently is generally adopted a method of circulating a refrigerant (cooling water) via the fuel cell and appropriately cooling the cell (see paragraphs 0022 to 0025 and FIG. 1 in Japanese Patent Laid-Open Publication No. 2004-234902).

On the other hand, in order to downsize the system, a technology is proposed that integrally configures a pump for supplying a refrigerant and a compressor for supplying air to a cathode and that integrally drives them with one drive device (for example, a motor).

However, thus if a pump and a compressor have one drive device in common and are integrally driven, for example, air and a refrigerant are sent in activating a fuel cell, and heat generated by self heat generation is radiated into the refrigerant; as a result, warming up the fuel cell is delayed in some case. Furthermore, in a case of activating a fuel cell below a freezing point, there is also a possibility that water generated by power generation and condensed water freeze within the cell, depending on a refrigerant.

Consequently, there is a need for a fuel cell system that can be downsized and preferably warmed up.

SUMMARY OF THE INVENTION

In order to solve the problems, the present invention is a fuel cell system comprising: a fuel cell having a reaction gas flow passage where a reaction gas communicates, generating power by the reaction gas being supplied to the reaction gas flow passage, having a refrigerant flow passage where a refrigerant communicates, and cooled by the refrigerant being supplied to the refrigerant flow passage; a reaction gas supply device for supplying the reaction gas to the reaction gas flow passage; a refrigerant supply device for supplying the refrigerant to the refrigerant flow passage; a refrigerant supply restriction device for restricting a refrigerant supply amount to the refrigerant flow passage; and a controller for controlling the refrigerant supply restriction device, wherein the reaction gas supply device and the refrigerant supply device have a drive device in common and are integrally driven, and wherein when warming up the fuel cell, the controller controls the refrigerant supply restriction device and reduces the refrigerant supply amount to the refrigerant flow passage.

In accordance with such the fuel cell system, the reaction gas supply device and the refrigerant supply device have one drive device in common, and thereby the system is downsized. Then in a case of warming up a fuel cell, by integrally driving the reaction gas supply device and the refrigerant supply device by one drive device and simultaneously reducing a refrigerant supply amount to the refrigerant flow passage by the refrigerant supply restriction device, it is possible to preferably warm up the fuel cell.

Furthermore, the present invention is a fuel cell system, wherein the refrigerant supply restriction device comprises a bypass flow passage for bypassing the refrigerant flow passage.

In accordance with such the fuel cell system, by bypassing a refrigerant, it is possible to reduce a refrigerant supply amount to the refrigerant flow passage of a fuel cell.

Furthermore, the present invention is a fuel cell system, wherein the refrigerant supply restriction device comprises a pressure loss addition device for adding a pressure loss to a refrigerant supplied to the refrigerant flow passage.

In accordance with such the fuel cell system, by adding a pressure loss to a refrigerant with the pressure loss addition device, it is possible to reduce a refrigerant supply amount to the refrigerant flow passage.

Furthermore, the present invention is a fuel cell system further comprising a heat generation amount detection device for detecting a heat generation amount of the fuel cell, wherein the controller controls the refrigerant supply restriction device, based on the heat generation amount detected by the heat generation amount detection device.

In accordance with such the fuel cell system, it is possible to control the refrigerant supply restriction device, based on a heat generation amount detected by the heat generation amount detection device.

BEST MODE FOR CARRYING OUT THE INVENTION

Here will be described embodiments of the present invention, referring to drawings as needed. In addition, in a description of each embodiment a same symbol will be appended to a same component, and a duplicated description will be omitted.

First Embodiment: Configuration of Fuel Cell System

A fuel cell system related to a first embodiment of the present invention will be described, referring to FIGS. 1 to 3.

Figure 1:
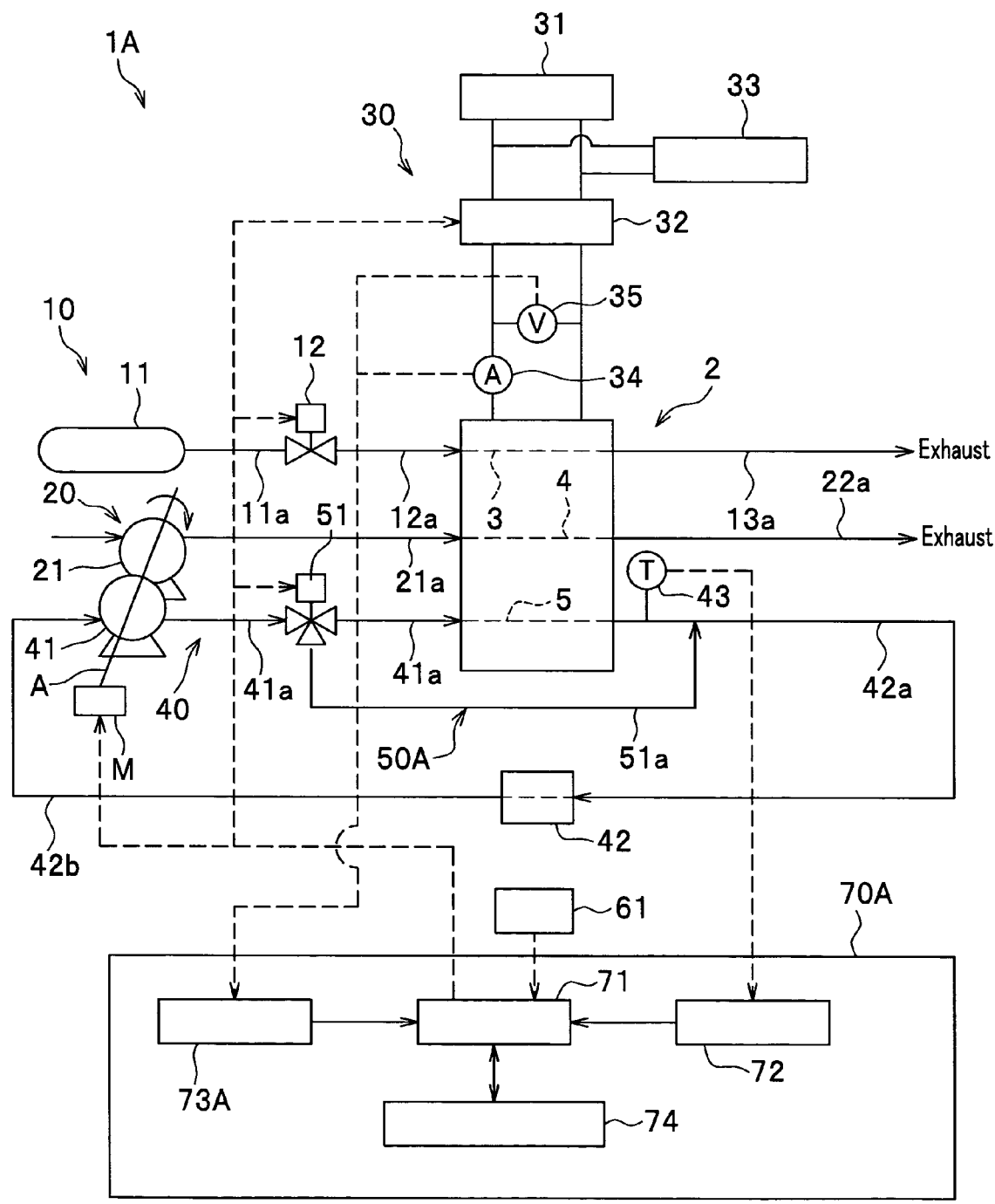
FIG. 1 is a drawing showing a configuration of a fuel cell system related to a first embodiment of the present invention.

As shown in FIG. 1, a fuel cell system 1A related to the first embodiment is mounted on a fuel cell vehicle, and the vehicle is designed to drive an electromotive traction motor 31 run by power generated with a fuel cell 2 and to run. The fuel cell system 1A mainly comprises the fuel cell 2, an anode loop 10 for supplying and discharging hydrogen (fuel gas, reaction gas) to/from the cell 2, a cathode loop 20 for supplying and discharging air containing oxygen (oxidizer gas, reaction gas) to/from the cell 2, a power consumption loop 30 connected to an output terminal of the cell 2 and consuming the power; a cooling loop 40 for appropriately cooling the cell 2, a refrigerant supply restriction device 50A for appropriately restricting a refrigerant supply amount to the cell 2, an IG (Igniter) 61 of an activation switch of the system 1A, and an ECU (Electronic Control Unit) 70A for electronically controlling these.

<Fuel Cell>

The fuel cell 2 (fuel cell stack) is a polymer electrolyte fuel cell configured by a single cell being plurally stacked. The single cell is configured with an MEA (Membrane Electrode Assembly), which is composed by sandwiching both faces of an electrolyte membrane (polymer membrane) with an anode (fuel electrode) and a cathode (air electrode), and a pair of separators for sandwiching the MEA. In the separators are respectively formed such grooves for supplying the reaction gases to a whole face of the MEA configuring each single cell, and through holes for introducing hydrogen and oxygen to all single cells; such the grooves are designed to be respectively an anode side passage 3 and a cathode side passage 4 (reaction gas flow passages). In other words, with the anode side passage 3 communicates hydrogen as a fuel gas, and the communicating hydrogen is designed to be supplied to each anode. On the other hand, with the cathode side passage 4 communicates air containing oxygen as an oxidizer gas, and the communicating air is designed to be supplied to each cathode.

Then if hydrogen and air containing oxygen are respectively supplied to the anode and the cathode, an electrochemical reaction occurs on a catalyser (Pt and the like) contained in the anode and the cathode, and as the result, a potential difference is designed to occur between each single cell. Then if there exists a power generation request from an external load such as the traction motor 31 for the fuel cell 2 where the potential difference has thus occurred, the cell 2 is designed to generate power. In addition, if the power is thus generated, the fuel cell 2 generates heat by itself.

Furthermore, in the separators is formed a refrigerant flow passage 5 where a refrigerant communicates, and by the refrigerant communicating with the passage 5, the fuel cell 2 is designed to be cooled as needed.

<Anode Loop>

The anode loop 10 mainly comprises a hydrogen tank 11, where hydrogen is stored, and a shutoff valve 12. The hydrogen tank 11 is connected to the shutoff valve 12 through a piping 11a; the shutoff valve 12 is connected to the anode side passage 3 through a piping 12a. Furthermore, the shutoff valve 12 is connected to an operation control portion 71 of the ECU 70A, appropriately controlled by the portion 71, and if the shutoff valve 12 is opened, the hydrogen is designed to be supplied to the anode side passage 3 from the hydrogen tank 11. In addition, a pressure reducing valve (not shown) is provided in the piping 12a, and the hydrogen is reduced to a predetermined pressure.

On the other hand, a downstream side of the anode side passage 3 is opened to outside air through a piping 13a. Then an anode off-gas (hydrogen off-gas) discharged from the fuel cell 2 is designed to be exhausted outside through the piping 13a.

<Cathode Loop>

The cathode loop 20 mainly comprises a compressor 21 (supercharger) of a reaction gas supply device. The compressor 21 is connected to the cathode side passage 4 through a piping 21a, and if the compressor 21 is actuated, outside air is designed to be took in and sent to the passage 4. Furthermore, in the piping 21a is provided a humidifier (not shown), and air supplied to the cathode side passage 4 is designed to be humidified.

On the other hand, a downstream side of the cathode side passage 4 is opened to outside air through a piping 22a. Then a cathode off-gas (air off-gas) discharged from the cathode side passage 4 is designed to communicate within the piping 22a and to be exhausted at the downstream side.

Furthermore, the compressor 21 has one motor M (drive device) in common with a pump 41 (refrigerant supply device) of the cooling loop 40. In other words, around a drive shaft A of the motor M are fixed, for example, an impeller (not shown) of the compressor 21 and that (not shown) of the pump 41; if the motor M is driven, the both impellers are designed to integrally rotate. In other words, the compressor 21 and the pump 41 are designed to have the motor M in common and to be integrally driven. Then by having the motor M in common, the system is downsized, a number of parts is reduced, and cost is reduced.

<Power Consumption Loop>

The power consumption loop 30 is connected to an output terminal (not shown) of the fuel cell 2 and is the loop that consumes power generated in the cell 2. The power consumption loop 30 mainly comprises the traction motor 31 (external load) for running a fuel cell vehicle, a VCU (Voltage Control Unit) 32, a power accumulator 33, an ampere meter 34 (heat generation amount detection device), and a voltage meter 35 (heat generation amount detection device).

The traction motor 31 is connected to an output terminal of the fuel cell 2 through the VCU 32. The power accumulator 33 is designed to be connected to the traction motor 31, in parallel between the VCU 32 and the motor 31, to supply accumulated power to the motor 31 and thereby assist the fuel cell 2, and to accumulate excessive power of the cell 2. As such the power accumulator 33 can be cited, for example, such a capacitor (electric double layer capacitor) and a battery.

The VCU 32 is an instrument for controlling an output current and voltage of the fuel cell 2. In other words, the VCU 32 is an instrument for making the fuel cell 2 generate power by appropriately taking out a current. Such the VCU 32 comprises, for example, such a contactor (relay) and a DC-DC converter. Then the VCU 32 is connected to the operation control portion 71, and the output current and voltage are controlled by the portion 71. In other words, for example, if the operation control portion 71 makes the output current "0", the fuel cell 2 is set not to generate power.

The ampere meter 34 is provided at a proper place between the fuel cell 2 and the VCU 32 so that an actual output current of the cell 2 (whole stack) can be detected. Then the ampere meter 34 is connected to a power integration portion 73A of the ECU 70A, and the portion 73A is designed to monitor the output current of the fuel cell 2.

The voltage meter 35 is provided at a proper place between the fuel cell 2 and the VCU 32 so that an actual output voltage of the cell 2 (whole stack) can be detected. Then the voltage meter 35 is connected to the power the integration portion 73A of the ECU 70A, and the portion 73A is designed to monitor the output voltage of the fuel cell 2. Other than this, the ampere meter 34 and the voltage meter 35 may be provided for every single cell configuring the fuel cell 2.

<Cooling Loop>

The cooling loop 40 is the loop for appropriately cooling the fuel cell 2 so that its temperature does not excessively rise, and mainly comprises the pump 41 of the refrigerant supply device, a radiator 42, and a temperature sensor 43. Then in the cooling loop 40, toward a downstream side from the pump 41 are connected a piping 41a, the refrigerant flow passage 5 of the fuel cell 2, a piping 42a, the radiator 42, a piping 42b, and the pump 41 in this order, and a refrigerant is designed to circulate. In addition, the refrigerant is composed of a radiator liquid of which a main composition is, for example, such polyethylene glycol. Furthermore, as described before, the pump 41 and the compressor 21 of the cathode loop 20 have the motor M in common, and are designed to be integrally driven.

The temperature sensor 43 is provided in the piping 42a at a side (upstream side) of the fuel cell 2 more than a confluence of a piping 51a described later, and is designed to detect a temperature of a refrigerant discharged from the cell 2 as a system temperature of the fuel cell system 1A. Then the temperature sensor 43 is connected to a warming-up determination portion 72 of the ECU 70A, and the portion 72 is designed to monitor the system temperature.

<Refrigerant Supply Restriction Device>

The refrigerant supply restriction device 50A comprises a distributor 51 (three-way valve) and the piping 51a (bypass flow passage).

The distributor 51 is provided on the piping 41a. Furthermore, the distributor 51 is connected to the operation control portion 71 and appropriately changed thereby. The piping 51a connects the distributor 51 to the piping 42a at a downstream side of the temperature sensor 43. Then the operation control portion 71 appropriately changes the distributor 51, and thereby a refrigerant sent from the pump 41 is designed to be appropriately distributed to the side of the fuel cell 2 and that of the piping 51a, including zero. In other words, if the distributor 51 is changed and the refrigerant is sent to the side of the piping 51a, the refrigerant is designed to bypass the refrigerant flow passage 5 of the fuel cell 2, and a refrigerant supply amount to the passage 5 is designed to be reduced and restricted.

<IG>

The IG 61 is the activation switch of the fuel cell system 1A (fuel cell vehicle) and is arranged around a driver's seat. Then the IG 61 is connected to the operation control portion 71 of the ECU 70A, and the portion 71 is designed to detect an ON/OFF signal of the IG 61.

<ECU>

The ECU 70A is configured with such a CPU (Central Processing Unit), a ROM (Read Only Memory), a RAM (Random Access Memory), various interfaces, and an electronic circuit. Such the ECU 70A comprises the operation control portion 71 (controller), the warming-up determination portion 72 (warming-up determination device), the power integration portion 73A (heat generation amount detection device), and a refrigerant supply amount integration portion 74.

[Operation Control Portion]

The operation control portion 71 is connected to the motor M of the drive device of the compressor 21 and the pump 41, and is designed to appropriately drive the motor M. Furthermore, the operation control portion 71 changes the distributor 51 to "restriction mode" or "normal mode", has a flag A corresponding to the mode (the restriction mode: flag A=0, the normal mode: flag A=1), and further has this determination function (FIG. 2, S102). Here, the "normal mode" means a mode not restricting a refrigerant supply to the refrigerant flow passage 5. On the other hand, the "restriction mode" means a mode that bypasses the refrigerant flow passage 5, and reduces and restricts a refrigerant supply amount by supplying a part of the refrigerant to the side of the piping 51a.

Moreover, other than this, the operation control portion 71 is connected to the shutoff valve 12 and the VCU 32, and is designed to appropriately control them.

[Warming-up Determination Portion]

The warming-up determination portion 72 is connected to the temperature sensor 43, and is designed to monitor the system temperature detected by the sensor 43. Then the warming-up determination portion 72 is designed to compare a warming-up completion temperature memorized therein with the system temperature, to determine whether or not warming up the fuel cell 2 is requested in activating the fuel cell system 1A, and to send its determination result to the operation control portion 71.

Here, the warming-up completion temperature is a temperature where warming up the fuel cell 2 is not inhibited. Further giving a description, the warming-up completion temperature is set: to an extent of a temperature where if a refrigerant temperature reaches the completion temperature, the fuel cell 2 and the refrigerant are preferably warmed up, and the refrigerant does not excessively take self heat generation of the cell 2; that is, to an extent of a temperature where the fuel cell 2 is not excessively cooled by the refrigerant. In other words, the warming-up completion temperature is set to a temperature where a stable operation of the fuel cell system 1A is ensured.

[Power Integration Portion]

The power integration portion 73A is connected to the ampere meter 34 and monitors the output current of the fuel cell 2. Furthermore, the power integration portion 73A is connected to the voltage meter 35 and monitors the output voltage of the fuel cell 2. Then the power integration portion 73A is designed to calculate power of the fuel cell 2, based on the output current and the output voltage, and to integrate the power (FIG. 2, S103).

Figure 2:
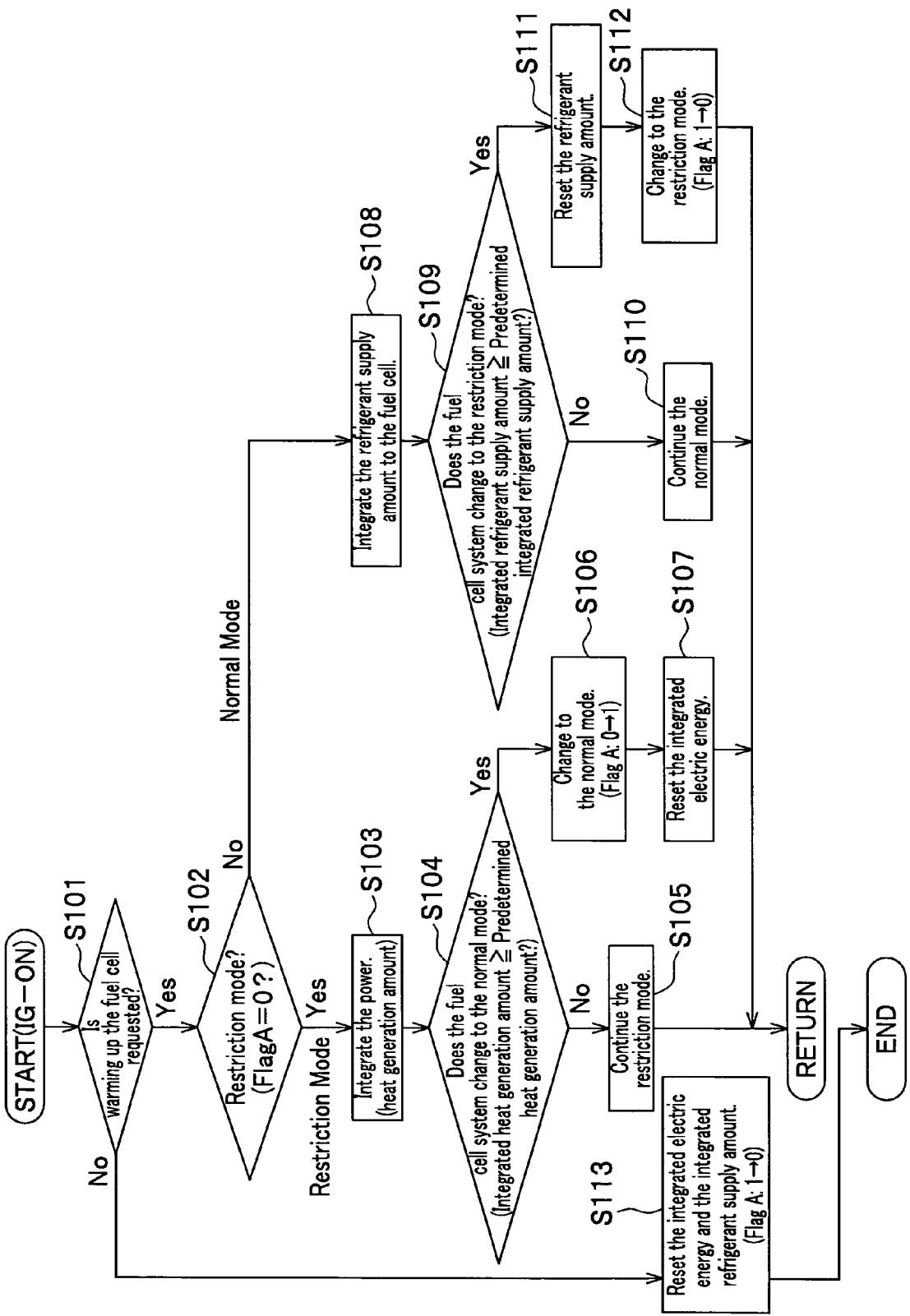
FIG. 2 is a flowchart showing an operation in activation of the fuel cell system related to the first embodiment.

Furthermore, in the power integration portion 73A is memorized a heat generation amount map where the integrated power (hereinafter referred to as "integrated electric energy") and integrated heat generation amount of the fuel cell 2 are related, and the portion 73A is designed to calculate the integrated heat generation amount of the cell 2, based on the integrated electric energy and the heat generation amount map (FIG. 2, S103).

Moreover, in the power integration portion 73A is memorized a predetermined integrated heat generation amount that becomes a determination reference of whether or not the fuel cell system 1A transits to the normal mode during control in the restriction mode, and the portion 73A is designed to determine whether or not the system 1A transits to the normal mode by comparing the integrated heat generation amount with the predetermined integrated heat generation amount (FIG. 2, S104), and to send its determination result to the operation control portion 71. In addition, the predetermined integrated heat generation amount is an estimated heat generation amount where a temperature distribution occurs in the fuel cell 2 by the refrigerant supply being restricted, and where a hot spot temperature (local temperature) within the cell 2 reaches a limit temperature that the cell 2 can endure. In other words, in a case that the hot spot temperature thus becomes higher, the fuel cell 2 does not uniformly generate heat by itself and the hot spot (locally higher temperature portion) occurs by the self heat generation.

[Refrigerant Supply Amount Integration Portion]

If the refrigerant supply amount integration portion 74 detects that the operation control portion 71 has selected the normal mode, the portion 74 has a function of integrating a refrigerant amount sent into the fuel cell 2 during the normal mode, based on an opening at the side of the cell 2 of the distributor 51, a rotation speed of the motor M, and a built-in clock (FIG. 2, S108). In addition, the opening of the distributor 51 and the rotation speed of the motor M corresponding to a target refrigerant supply amount in the normal mode are in advance memorized in the refrigerant supply amount integration portion 74.

Then the refrigerant supply amount integration portion 74 has a function of comparing the integrated refrigerant supply amount with a predetermined integrated refrigerant supply amount memorized therein, and determining whether or not the fuel cell system 1A transits to the restriction mode from the normal mode (FIG. 2, S109). The refrigerant supply amount integration portion 74 has a function of determining whether or not the hot spot temperature has lowered to an extent of a temperature where the hot spot temperature can endure a refrigerant supply restricted in the restriction mode, that is, whether or not the hot spot has been eliminated (FIG. 2, S109).

<<Operation of Fuel Cell System>>

Next will be described an operation of the fuel cell system 1A related to the first embodiment, mainly referring to FIG. 2.

As shown in FIG. 2, for example, if the IG 61 is made ON (START) to start (activate) a fuel cell vehicle (fuel cell system 1A), the operation control portion 71 receives the ON signal of the IG 61, then opens the shutoff valve 12, and supplies hydrogen to the anode side passage 3. In parallel with this, the operation control portion 71 rotates the motor M, integrally drives the compressor 21 and the pump 41, and supplies air to the cathode side passage 4 and a refrigerant to the refrigerant flow passage 5. Subsequently, the operation control portion 71 controls the VCU 32, takes out a current from the fuel cell 2, and makes the cell 2 generate power.

In addition, in activating the fuel cell system 1A the flag A is reset (flag A=0).

<Warming-up Determination>

In a step S101 the warming-up determination portion 72 compares the system temperature detected through the temperature sensor 43 with the warming-up completion temperature memorized therein, and determines whether or not warming up the fuel cell 2 is requested. Then if "system temperature<warming-up completion temperature", the warming-up determination portion 72 determines that the warming-up is requested (Yes in the S101), and the operation proceeds to the step S102. On the other hand, if "system temperature>warming-up completion temperature", the warming-up determination portion 72 determines that the warming-up is not requested (No in the S101), and the operation proceeds to a step S113.

<Mode Determination>

In the step S102 the operation control portion 71 determines whether or not the refrigerant supply to the fuel cell 2 is the restriction mode. If the flag A is "0", the operation control portion 71 determines that the refrigerant supply is the restriction mode (Yes in the S102), and the operation proceeds to the step S103. If the flag A is not "0", the operation control portion 71 determines that the refrigerant supply is not the restriction mode (No in the S102), and the operation proceeds to the step S108.

<Restriction Mode>

Firstly will be described the restriction mode for restricting a refrigerant supply amount to the fuel cell 2. In addition, because if the fuel cell system 1A enters in the restriction mode, the refrigerant supply amount to the fuel cell 2 becomes less, warming up the cell 2 is promoted by self heat generation.

In the step S103 the power integration portion 73A detects an output current and voltage through the ampere meter 34 and the voltage meter 35, calculates power based on these, further integrates the power, and starts to calculate the integrated electric energy. In addition, if the integrated electric energy is already calculated, it is continually calculated. Next, the power integration portion 73A calculates an integrated heat generation amount of the fuel cell 2, based on the integrated electric energy and the heat generation amount map memorized therein.

In the step S104 the power integration portion 73A determines whether or not the fuel cell system 1A transits to the normal mode. To be more precise, the power integration portion 73A compares the integrated heat generation amount with a predetermined integrated heat generation amount memorized therein, and determines whether or not the fuel cell system 1A transits to the normal mode.

If "integrated heat generation amount≧predetermined integrated heat generation amount", the power integration portion 73A determines that the fuel cell system 1A transits to the normal mode (Yes in the S104), it sends the determination result to the operation control portion 71. The portion 71 changes the distributor 51 corresponding to the normal mode, increases a refrigerant amount to the side of the refrigerant flow passage 5, and releases the refrigerant supply restriction (S106). Together with this, the operation control portion 71 raises the flag A (0→1). Thus the hot spot temperature gradually lowers and the fuel cell 2 is protected. Then the power integration portion 73A resets the integrated electric energy (S107). Thereafter, the operation proceeds to "RETURN" and returns to "START."

If "integrated heat generation amount<predetermined integrated heat generation amount", the power integration portion 73A determines that the fuel cell system 1A does not transit to the normal mode, that is, to continue the restriction mode (No in the S104), it sends the determination result to the operation control portion 71. The portion 71 maintains to control the distributor 51 in the restriction mode and continues the refrigerant supply restriction (S105). Thereafter, the operation proceeds to "RETURN" and returns to "START."

<Normal Mode>

Next will be described the normal mode for normally supplying a refrigerant to the fuel cell 2.

In the step S108 the refrigerant supply amount integration portion 74 starts to calculate an integrated refrigerant supply amount sent into the fuel cell 2, based on the opening at the side of the cell 2 of the distributor 51, the rotation speed of the motor M, and the built-in clock. In addition, if the integrated refrigerant supply amount is already calculated, it is continually calculated.

In the step S109 the refrigerant supply amount integration portion 74 determines whether or not the fuel cell system 1A transits to the restriction mode. To be more precise, the refrigerant supply amount integration portion 74 compares the integrated refrigerant supply amount with a predetermined integrated refrigerant supply amount, and determines whether or not the fuel cell system 1A transits to the restriction mode.

If "integrated refrigerant supply amount≧predetermined integrated refrigerant supply amount", the refrigerant supply amount integration portion 74 determines that the fuel cell system 1A transits to the restriction mode (Yes in the S109), it sends the determination result to the operation control portion 71 and resets the integrated refrigerant supply amount (S111). Then the operation control portion 71 changes the distributor 51 corresponding to the restriction mode, restricts a refrigerant supply amount to the fuel cell 2, and starts the refrigerant supply restriction (S112). Together with this, the operation control portion 71 resets the flag A (1→0). Thus over-cooling the fuel cell 2 due to the normal mode, that is, a delay of the warming-up is prevented. Thereafter, the operation proceeds to "RETURN" and returns to "START."

If "integrated refrigerant supply amount<predetermined integrated refrigerant supply amount", the refrigerant supply amount integration portion 74 determines that the fuel cell system 1A does not transit to the restriction mode, that is, to continue the normal mode (No in the S109), it sends the determination result to the operation control portion 71. Then the portion 71 maintains to control the distributor 51 in the normal mode and continues the refrigerant supply as it is, (S110). Thereafter, the operation proceeds to "RETURN" and returns to "START."

<Warming-up Completion>

Next will be described a case with no need of warming up the fuel cell 2, that is, the case of the warming-up being completed (No in the S101) and the operation proceeding to the step S113.

In the step S113 the power integration portion 73A resets the integrated electric energy, the refrigerant supply amount integration portion 74 resets the integrated refrigerant supply amount, and the operation control portion 71 resets the flag A (1→0). Thus a preparation for a next activation can be made. Then the operation proceeds to "END", and controlling the refrigerant supply is finished in activating the fuel cell system 1A.

Thus in accordance with the fuel cell system 1A related to the first embodiment, by having the motor M in common with the compressor 21 and the pump 41, downsizing the system, and the operation control portion 71 changing the distributor 51, it is possible to appropriately restrict a refrigerant supply amount to the refrigerant flow passage 5, to protect the fuel cell 2, and to promote warming up the cell 2.

<<One Operation Example of Fuel Cell System>>

Next will be described one operation example of the fuel cell system 1A related to the first embodiment, mainly referring to FIG. 3. In addition, in an initial state the flag A is reset (flag A=0), and the integrated electric energy and the integrated refrigerant supply amount are both reset.

Figure 3:
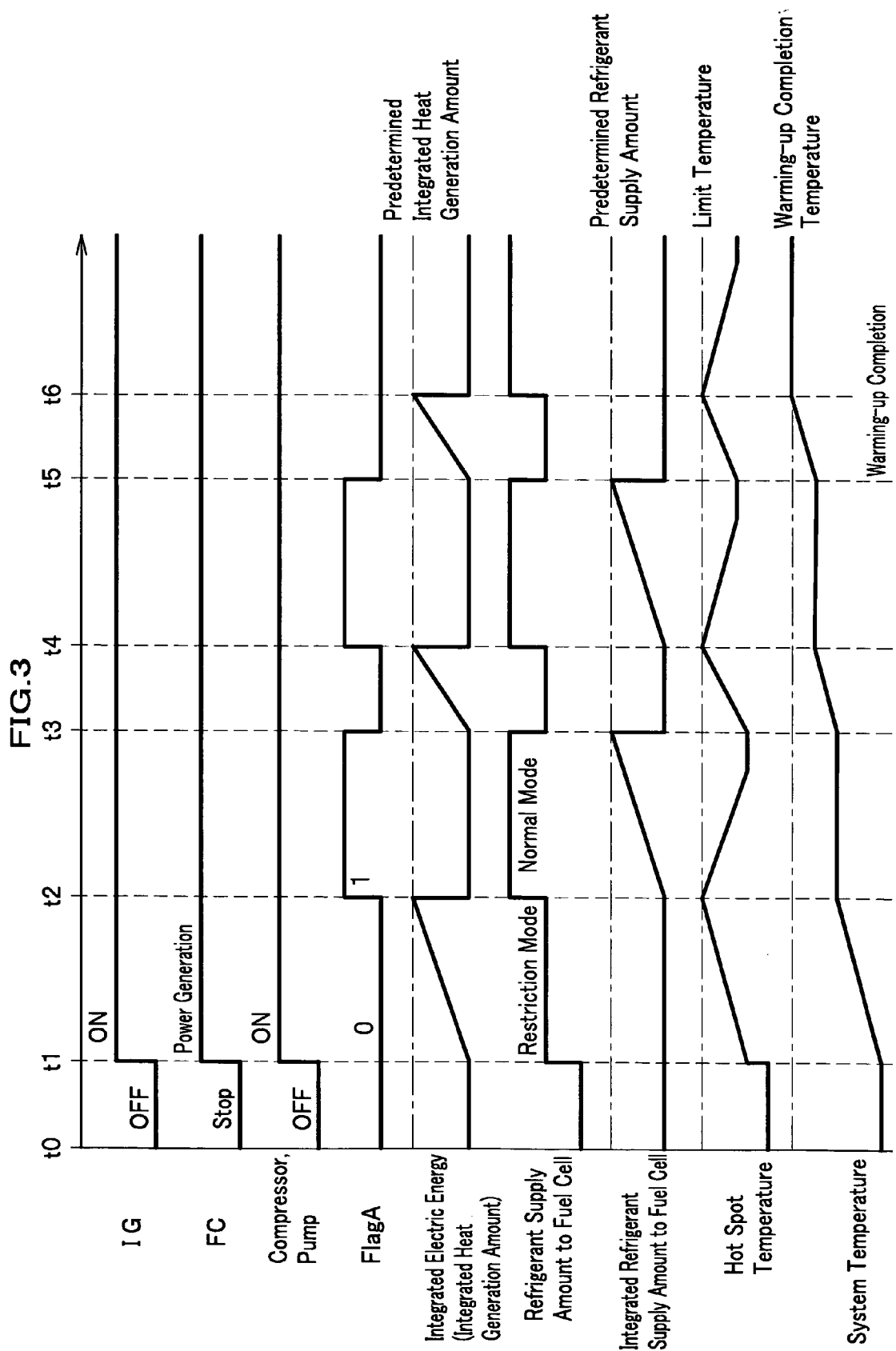
FIG. 3 is a time chart showing one operation example of the fuel cell system related to the first embodiment.

As shown in FIG. 3, if the IG 61 is made ON in order to start (activate) a fuel cell vehicle (fuel cell system 1A) at a time t1, hydrogen is supplied, the motor M rotates, thereby the compressor 21 and the pump 41 are integrally driven, and air and a refrigerant are supplied, respectively. Then the VCU 32 is controlled and the fuel cell 2 generates power.

<Repetition of Restriction Mode and Normal Mode>

Here, assuming that "system temperature<warming-up completion temperature" (Yes in the S101) and the flag A is "0", the fuel cell system 1A enters in the restriction mode for restricting the refrigerant supply (Yes in the S102) and the operation proceeds to the route of the steps S103, No in the S104, S105, Yes in the S101, and Yes in the S102. Then an integrated heat generation amount increases corresponding to an increase of integrated electric energy, and if "integrated heat generation amount≧predetermined integrated heat generation amount" at a time t2 (Yes in the S104), the fuel cell system 1A transits to the normal mode for not restricting the refrigerant supply (S106), the flag A (0→1) is raised, and the integrated electric energy is reset (S107).

After the fuel cell system 1A transits to the normal mode (No in the S102), integrating the refrigerant supply amount to the fuel cell 2 is started (S108). Thereafter the operation proceeds to the route of the steps No. in the S109, S110, Yes in the S101, No. in the S102, and S108, and the hot spot temperature gradually lowers. Then if "integrated refrigerant supply amount ≧predetermined integrated refrigerant supply amount" at a time t3 (Yes in the S109), the integrated refrigerant supply amount is reset (S111), the fuel cell system 1A transits to the restriction mode (S112) and the flag A (1→0) is reset.

Thereafter the fuel cell system 1A is controlled in the restriction mode, and the operation proceeds to the route of the steps Yes in the S101, Yes in the S102, S103, No. in the S104, and S105. Then if "integrated heat generation amount≧predetermined integrated heat generation amount" at a time t4 (Yes in the S104), the fuel cell system 1A transits to the normal mode (S106) and the integrated electric energy is reset (S107).

Next, the fuel cell system 1A is controlled in the normal mode, and the operation proceeds to the route of the steps No. in the S102, S108, No. in the S109, and S110. Then if "integrated refrigerant supply amount≧predetermined integrated refrigerant supply amount" at a time t5 (Yes in the S109), the integrated refrigerant supply amount is reset (S111), and the fuel cell system 1A transits to the restriction mode (S112).

<Restriction Mode-Warming-up Completion>

Thereafter the fuel cell system 1A is controlled in the restriction mode, and the operation proceeds to the route of the steps Yes in the S101, Yes in the S102, S103, No. in the S104, and S105; if "integrated heat generation amount≧predetermined integrated heat generation amount" at a time t6 (Yes in the S104), the fuel cell system 1A transits to the normal mode (S106), and the integrated electric energy is reset (S107).

Here, in the first embodiment is assumed a case that the system temperature reaches the warming-up completion temperature at the same time of the fuel cell system 1A transiting to the normal mode. Thus warming up the fuel cell 2 is determined not necessary (that is, warming-up completion) (No in the S101). Then the operation control portion 71 changes the distributor 51 to the normal mode, and thereafter the fuel cell 2 of which the warming-up is completed preferably generates power in continuation.

Second Embodiment: Configuration of Fuel Cell System

Next will be described a fuel cell system related to a second embodiment, referring to FIGS. 4 to 6. In addition, because the fuel cell system related to the second embodiment is the system where a part of the fuel cell system 1A related to the first embodiment is changed, only the changed portion will be described.

Figure 4:
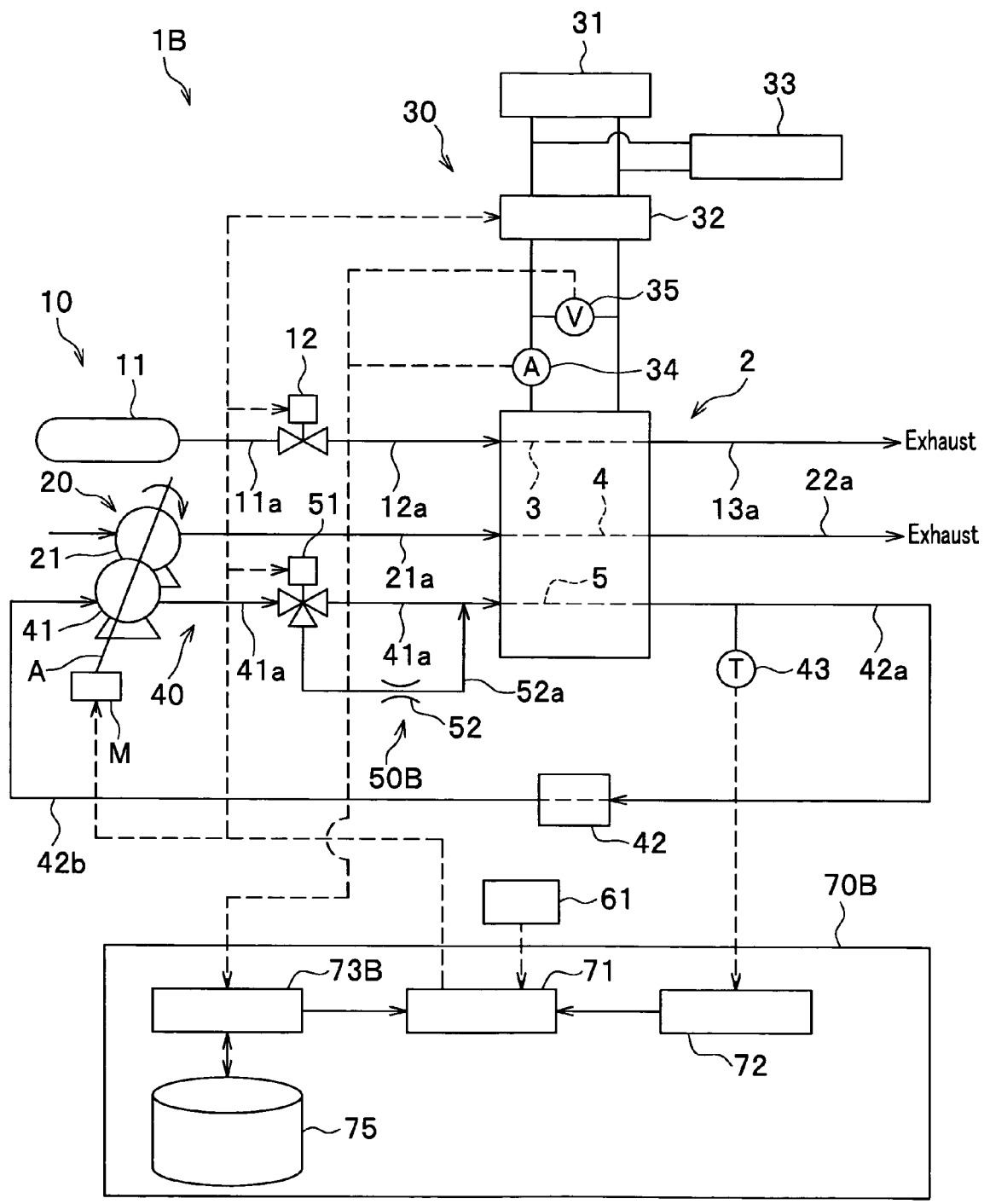
FIG. 4 is a drawing showing a configuration of a fuel cell system related to a second embodiment of the present invention.

As shown in FIG. 4, a fuel cell system 1B related to the second embodiment comprises a refrigerant supply restriction device 50B instead of the refrigerant supply restriction device 50A (see FIG. 1), and an ECU 70B in stead of the ECU 70A (see FIG. 1).

<Refrigerant Supply Restriction Device>

The refrigerant supply restriction device 50B comprises the distributor 51, an orifice 52 (pressure loss addition device), and a piping 52a. The piping 52a connects the distributor 51 to the piping 41a between the distributor 51 and the fuel cell 2. Then the orifice 52 is provided on the piping 41a. In addition, a flow passage section area of the orifice 52 is set smaller than that of the piping 41a between the distributor 51 and the fuel cell 2. Thus a higher pressure loss is added by the orifice 52 to a refrigerant sent to the piping 52a from the distributor 51 than that flowing in the piping 41a. Consequently, if heightening a distribution amount to the piping 52a by the distributor 51, a refrigerant supply amount to the refrigerant flow passage 5 is designed to be reduced and restricted.

<ECU>

The ECU 70B comprises the operation control portion 71, the warming-up determination portion 72, a power integration portion 73B (heat generation amount detection device), and an operation map memory portion 75 (heat generation amount detection device).

[Power Integration Portion]

Figure 5:
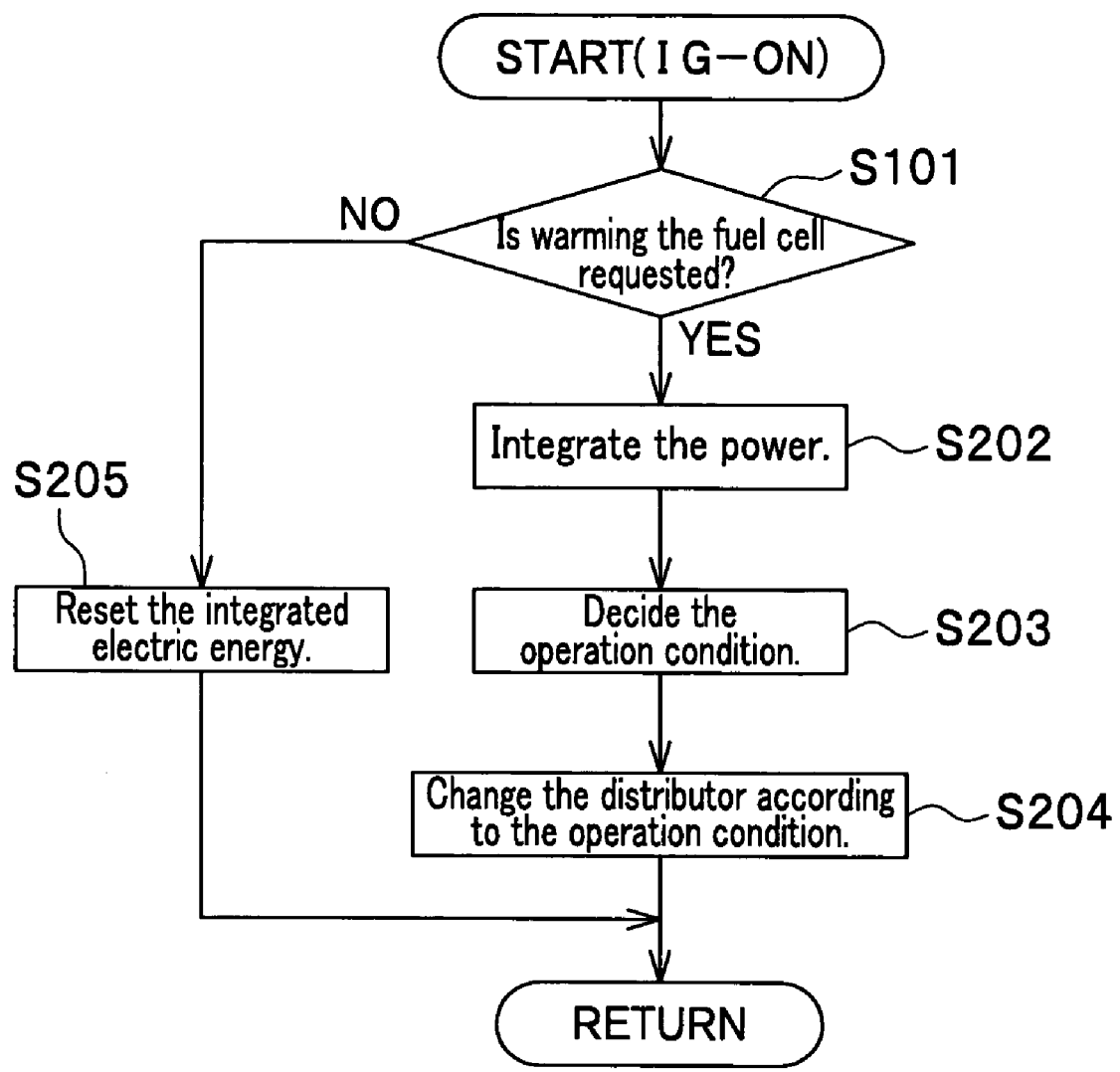
FIG. 5 is a flowchart showing an operation in activation of the fuel cell system related to the second embodiment.

The power integration portion 73B has a function of calculating the integrated electric energy of the fuel cell 2 similarly to the power integration portion 73A related to the first embodiment (FIG. 5, S202). Other than this, the power integration portion 73B has a function of deciding an operation condition of the distributor 51 (FIG. 5, S203), based on the calculated integrated electric energy and an operation map memorized in the operation map memory portion 75. Then the power integration portion 73B sends the decided operation condition to the operation control portion 71, and the portion 71 is designed to control the distributor 51 according to the condition (FIG. 5, S204).

[Operation Map Memory Portion]

In the operation map memory portion 75 is memorized, for example, such an operation map as shown in Table 1. The operation map is a map where integrated electric energy of the fuel cell 2 and an operation condition of the distributor 51 are related, and where the operation condition (with/without a refrigerant supply restriction) of the distributor 51 is allocated in each integrated electric energy range. The operation map is obtained by various preparatory tests and simulations, considering the heat generation amount of the fuel cell 2 based on an integrated electric energy value. Furthermore, as shown in Table 1, if the integrated electric energy (heat generation amount) becomes larger, that is, the power generation by the fuel cell 2 proceeds, the operation condition of the distributor 51 is set so that a time with the restriction becomes shorter and a time without the restriction longer.

TABLE 1

| Integrated Electric Energy of Fuel Cell (Wh) | 0-10 | 10-20 | 20-30 | 30- |
|---|---|---|---|---|
| Operation Condition of Distributor (s) With/Without Restriction | 30/10 | 20/20 | 10/30 | 0/40 |

<<Operation of Fuel Cell System>>

Next will be described an operation of the fuel cell system 1B related to the second embodiment, mainly referring to FIG. 5. Similarly to the first embodiment, if the IG 61 is made ON (START), the operation control portion 71 makes the fuel cell 2 generate power. Thereafter the warming-up determination portion 72 determines whether or not warming up the fuel cell 2 is requested (S101). Then if the warming-up is requested (Yes in the S101), the operation proceeds to a step S202; if the warming-up is not requested (No in the S101), the operation proceeds to a step S205.

In the step S202 the power integration portion 73B calculates the integrated electric energy of the fuel cell 2 after the ON of the IG 61. Next, the power integration portion 73B decides the operation condition of the distributor 51 (S203), based on the calculated integrated electric energy and the operation map, and sends the decided operation condition to the operation control portion 71.

In a step S204 the operation control portion 71 changes the distributor 51 according to the operation condition (with/without the refrigerant supply restriction) sent from the power integration portion 73B. Thus it is possible to prevent a temperature over-rise of the fuel cell 2 and at the same time to speedily warm the fuel cell 2. The operation proceeds to "RETURN" and returns to "START."

In the step S205 the power integration portion 73B resets the integrated electric energy. In addition, if warming up the fuel cell 2 is determined thus not necessary, the operation control portion 71 does not implement the refrigerant supply restriction by the distributor 51. The operation proceeds to "RETURN" and returns to "START."

<<One Operation Example of Fuel Cell System>>

Next will be described one operation example of the fuel cell system 1B, mainly referring to FIG. 6.

Figure 6:
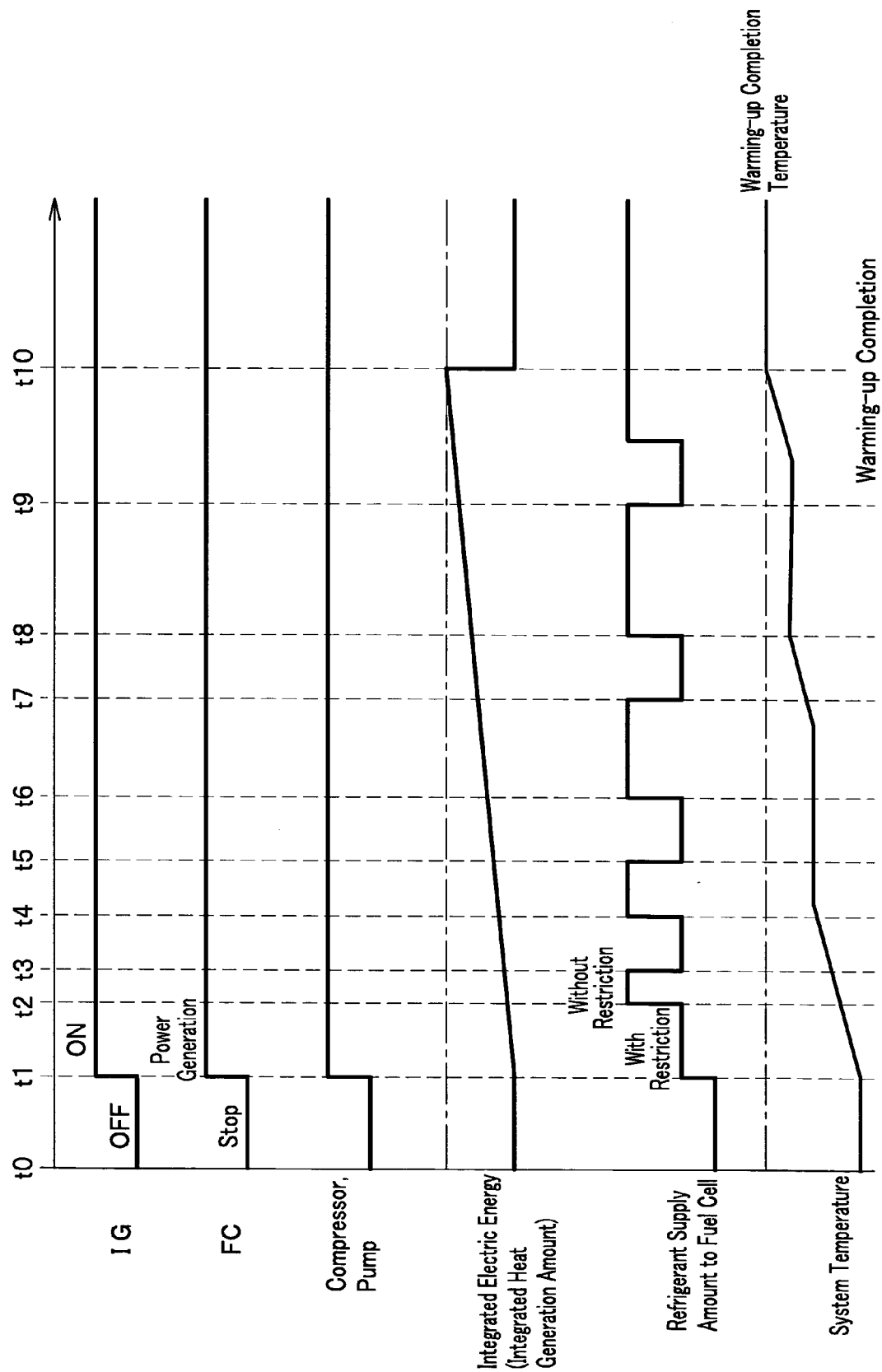
FIG. 6 is a time chart showing one operation example of the fuel cell system related to the second embodiment.

As shown in FIG. 6, if the IG 61 is made ON in order to start (activate) a fuel cell vehicle (fuel cell system 1B) at the time t1, the fuel cell 2 generates power. Then warming up the fuel cell 2 is determined to be requested (Yes in the S101), and thereafter the power integration portion 73B integrates the power of the cell 2 (S202) and decides the operation condition of the distributor 51, based on the integrated electric energy and the operation map (S203). Next, the operation control portion 71 changes the distributor 51 according to the decided operation condition (S204).

Thereafter the operation of the steps Yes in the S101, S202, S203, and S204 is repeated. Because while thus repeating the operation, the integrated electric energy gradually becomes larger, a time when the refrigerant supply is not restricted gradually becomes longer (times t2 to t3<t4 to t5<t6 to t7<t8 to t9).

Then if the system temperature becomes larger than the warming-up completion temperature at a time t10 (No. in the S101), the integrated electric energy is reset (S205) and the refrigerant is normally supplied without being restricted. Then the fuel cell 2 continually generates power.

Figure 7:
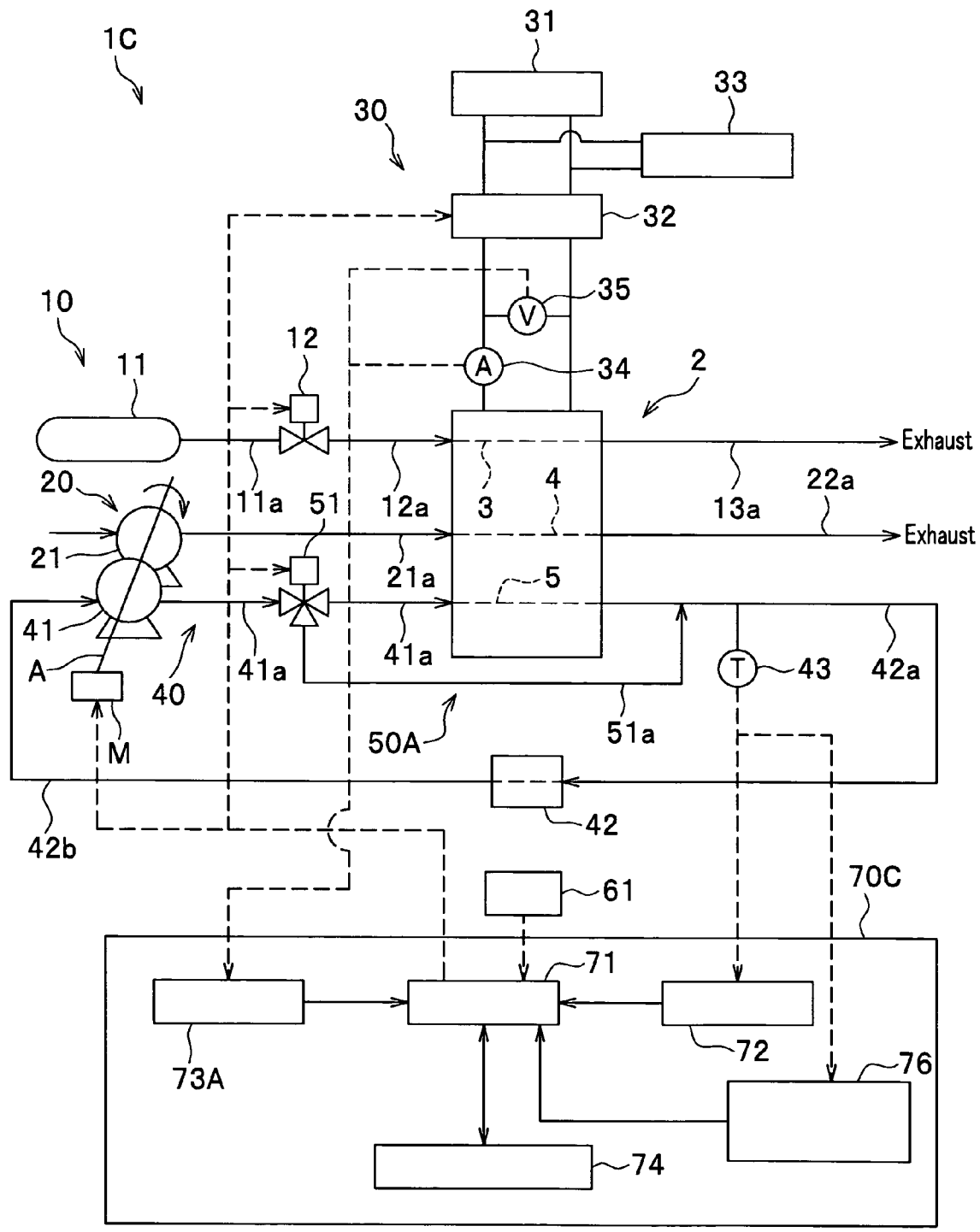
FIG. 7 is a drawing showing a configuration of a fuel cell system related to a variation example of the present invention.

Thus although the preferable embodiments of the present invention are described, the invention is not limited thereto and may combine each configuration of the embodiments within a spirit and scope of the invention; for example, the invention can also be changed as follows:

Instead of the ECU 70A related to the first embodiment is also available a fuel cell system 1C comprising an ECU 70C shown in FIG. 7. In addition to the configuration of the ECU 70A, the ECU 70C comprises a refrigerant restriction supply amount calculation portion 76 for calculating a refrigerant restriction supply amount supplied to the refrigerant flow passage 5 in the restriction mode. The refrigerant restriction supply amount calculation portion 76 is connected to the temperature sensor 43 and is designed to monitor the system temperature. Furthermore, the refrigerant restriction supply amount calculation portion 76 has a refrigerant restriction supply amount map where the system temperature and the refrigerant restriction supply amount (operation condition of the distributor 51) are related. In addition, if the system temperature becomes higher, the refrigerant restriction supply amount map has a relationship that the refrigerant restriction supply amount to the refrigerant flow passage 5 becomes more (an amount of reducing a refrigerant to the refrigerant flow passage 5).

When the fuel cell system 1C transits to the restriction mode from the normal mode, the refrigerant restriction supply amount calculation portion 76 calculates a refrigerant restriction supply amount corresponding to a warming-up state, based on the system temperature and the refrigerant restriction supply amount map, and sends the calculated amount to the operation control portion 71. Next, the operation control portion 71 changes the distributor 51 according to an operation condition corresponding to the refrigerant restriction supply amount. Thus it becomes possible to supply the refrigerant to the refrigerant flow passage 5 by the refrigerant restriction supply amount corresponding to the warming-up state of the fuel cell system 1C and to more speedily warm the system 1C.

Other than this, it is also available to configure so that the refrigerant restriction supply amount calculation portion 76 is connected to the ampere meter 34 and the voltage meter 35 and calculates the refrigerant restriction supply amount supplied to the refrigerant flow passage 5 in the restriction mode, corresponding to power generated by the fuel cell 2. In this case, a setting is that if the generated power becomes higher, the refrigerant restriction supply amount supplied to the refrigerant flow passage 5 becomes more (an amount of reducing the refrigerant to the refrigerant flow passage 5).

Figure 8:
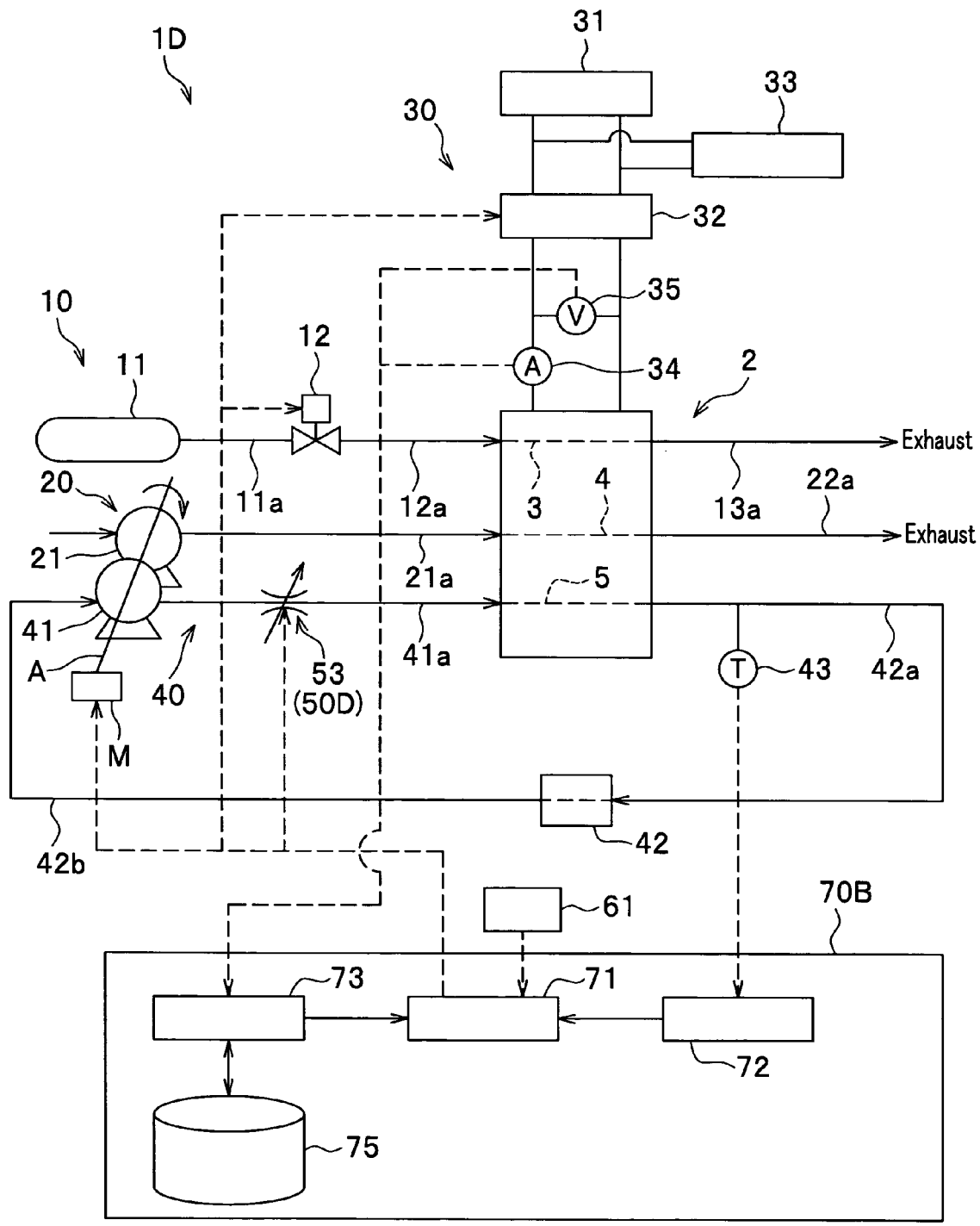
FIG. 8 is a drawing showing a configuration of a fuel cell system related to a variation example of the present invention.

Instead of the refrigerant supply restriction device 50B related to the second embodiment, a fuel cell system 1D comprising a refrigerant supply restriction device 50D shown in FIG. 8 is also available. The refrigerant supply restriction device 50D comprises a variable orifice 53 (pressure loss addition device), and the orifice 53 is provided on the piping 41a. Then the variable orifice 53 is connected to the operation control portion 71 of the ECU 70B, and the portion 71 is designed to control an opening of the orifice 53, that is, a pressure loss added to a refrigerant sent from the pump 41, corresponding to "with/without the refrigerant supply restriction." In other words, in a case of "with the refrigerant supply restriction," the restriction is implemented by reducing the variable orifice 53, adding a higher pressure loss to the refrigerant, and decreasing the refrigerant supply amount to the refrigerant flow passage 5.

Although in the respective embodiments are exemplified the cases that the fuel cell systems 1A, 1B are mounted on fuel cell vehicles, their usage mode is not limited thereto; the systems 1A, 1B may also be applied to other moving objects (such a ship) and a home-use stationary type.

Although the respective embodiments adopt the temperature sensor 43 for detecting a temperature of a refrigerant discharged from the cell 2 as a temperature detection device in order to implement the warming-up determination of the fuel cell 2, the device is not limited thereto: Other than this are also available, for example, respective temperature sensors attached to a housing of the fuel cell 2, provided in the piping 13a of the anode loop 10 and the piping 22a of the cathode loop 20, and for detecting an outside temperature; and based on temperatures detected by the sensors, the system temperatures of the fuel cell systems 1A, 1B may be predicted.

Furthermore, a plurality of such the temperature sensors may also be used; if it is set to determine that warming up the fuel cell 2 is completed, for example, when at least two temperatures detected in using the plurality of the sensors becomes not less than a warming-up completion temperature, an erroneous determination can be prevented.

Although in the respective embodiments are described the cases of applying the present invention to the fuel cell systems 1A, 1B where the compressor 21 for sending air (reaction gas) and the pump 41 for sending a refrigerant have the motor M in common and are integrally driven, the invention is not limited thereto; for example, the invention may also be applied to a fuel cell system where a compressor (for example, a compressor provided in a hydrogen circulation line) for sending hydrogen (reaction gas) and the pump 41 have the motor M in common and are integrally driven.

Although in the respective embodiments are described the cases of making the IG 61 ON, then driving the motor M at a constant rotation speed, making the motor M keeping the constant rotation speed even after the completion of warming up the fuel cell 2, the present invention may also be applied to, for example, a fuel cell system of heightening the self heat generation amount of the cell 2 and promoting the warming-up by making the rotation speed of the motor M higher than normal and supplying a large amount of air in a next activation in a case of experiencing a low temperature (for example, not more than five degrees Celsius) at stop. Thus by heightening the reaction gas supply amount in activation, a temperature distribution within the fuel cell 2 tends to vary in a case of a fuel cell system promoting the warming-up, and a hot spot tends to occur; however, by applying the present invention it is possible to suppress the occurrence of the hot spot and to promote warming up the fuel cell 2.

In the first embodiment, in the step S104 shown in FIG. 2, whether or not the fuel cell system 1A transits to the normal mode from the restriction mode is determined by comparing an integrated heat generation amount with a predetermined integrated heat generation amount: However, other than this, for example, (1) it is also available to configure to compare integrated electric energy with predetermined integrated electric energy and to transit to the normal mode if the integrated electric energy is not less than the predetermined integrated electric energy; furthermore, (2) it is also available to configure to use a timer and to transit to the normal mode if a time of the restriction mode becomes not less than a predetermined time memorized in advance; and (3) it is also available to configure to integrate a current value if moreover an I-V characteristic of the fuel cell 2 is constant, and to transit to the normal mode if the integrated current value becomes not less than a predetermined integration current value.

In the first embodiment, in the step S108 shown in FIG. 2, is exemplified a case that a predetermined integrated refrigerant supply amount that becomes a determination reference for transiting to the restriction mode from the normal mode is a fixed value; however, other than this, for example, it is also available to configure to appropriately calculate the predetermined integrated refrigerant supply amount, based on the system temperature and the map memorized therein. In this case, a setting is that if the system temperature becomes higher, the predetermined integrated refrigerant supply amount becomes larger.

What is claimed is:
1. A fuel cell system comprising:
a fuel cell having a reaction gas flow passage where a reaction gas communicates, generating power by the reaction gas being supplied to the reaction gas flow passage, having a refrigerant flow passage where a refrigerant communicates, and cooled by the refrigerant being supplied to the refrigerant flow passage;
a reaction gas supply device configured to supply the reaction gas to the reaction gas flow passage;
a refrigerant supply device configured to supply the refrigerant to the refrigerant flow passage, wherein the refrig- erant in a cooling loop is always in a liquid state during operation of the fuel cell, wherein the cooling loop is directly connected to an upstream side and a downstream side of the fuel cell;

a refrigerant supply restriction device configured to restrict a refrigerant supply amount to the refrigerant flow passage;

a controller configured to control the refrigerant supply restriction device; and a motor operatively coupled to the reaction gas supply device and the refrigerant supply device for always substantially simultaneously driving the reaction gas supply device and the refrigerant supply device during the operation of the fuel cell, wherein when warming up the fuel cell, the controller controls the refrigerant supply restriction device and reduces the refrigerant supply amount to the refrigerant flow passage.

2. The fuel cell system according to claim 1, wherein the refrigerant supply restriction device comprises the refrigerant flow passage.

3. The fuel cell system according to claim 1, wherein the refrigerant supply restriction device comprises a pressure loss addition device configured to add a pressure loss to a refrigerant supplied to the refrigerant flow passage.

4. The fuel cell system according to claim 1 further comprising:

a heat generation amount detection device configured to detect a heat generation amount of the fuel cell, wherein the controller controls the refrigerant supply restriction device, based on the heat generation amount detected by the heat generation amount detection device.

5. The fuel cell system according to claim 4, wherein the heat generation amount detection device calculates the heat generation amount by integrating generated power of the fuel cell.

6. The fuel cell system according to claim 4, wherein a time for actuating the refrigerant supply restriction device is made shorter as the heat generation amount becomes larger.

7. A control method for a fuel cell system including: a fuel cell configured to have a reaction gas flow passage where a reaction gas communicates, to generate power by the reaction gas being supplied to the reaction gas flow passage, to have a refrigerant flow passage where a refrigerant communicates, and to be cooled by the refrigerant being supplied to the refrigerant flow passage; a reaction gas supply device and a refrigerant supply device configured to have a drive device in common and be integrally driven; a refrigerant supply restriction device; and a controller, the method comprising the steps of:

supplying the reaction gas to the reaction gas flow passage by the reaction gas supply device;

supplying the refrigerant to the refrigerant flow passage by the refrigerant supply device, wherein the refrigerant in a cooling loop is always in a liquid state during operation of the fuel cell, wherein the cooling loop is directly connected to an upstream side and a downstream side of the fuel cell;

restricting a refrigerant supply amount to the refrigerant flow passage by the refrigerant supply restriction device;

controlling the refrigerant supply restriction device by the controller; and when warming up the fuel cell, controlling the refrigerant supply restriction device and reducing the refrigerant supply amount to the refrigerant flow passage by the controller.

8. The control method according to claim 7, wherein the refrigerant supply restriction device comprises the refrigerant flow passage.

9. The control method according to claim 7 comprising the step of adding a pressure loss to a refrigerant supplied to the refrigerant flow passage by a pressure loss addition device in the refrigerant supply restriction device.

10. The control method according to claim 7 further comprising the steps of detecting a heat generation amount of the fuel cell by a heat generation amount detection device and controlling the refrigerant supply restriction device, based on the heat generation amount detected by the heat generation amount detection device.

11. The control method according to claim 10 comprising the steps of integrating generated power of the fuel cell by the heat generation amount detection device and calculating the heat generation amount.

12. The control method according to claim 10 comprising the step of making shorter a time for actuating the refrigerant supply restriction device as the heat generation amount becomes larger.

* * * * *